US011622229B2

(12) United States Patent
Verma et al.

(10) Patent No.: US 11,622,229 B2
(45) Date of Patent: Apr. 4, 2023

(54) SYSTEM AND METHOD OF FORECASTING BASED ON PERIODICAL SKETCHING OF BIG DATA OF OBSERVATIONS

(71) Applicant: xAd, Inc., New York, NY (US)

(72) Inventors: Rupesh Verma, Fremont, CA (US); Reza Banikazemi, Antioch, CA (US); Zak Sellers, Brooklyn, NY (US); Jesal Deepak Janani, San Jose, CA (US)

(73) Assignee: xAd, Inc., New York, NY (US)

( * ) Notice: Subject to any disclaimer, the term of this patent is extended or adjusted under 35 U.S.C. 154(b) by 70 days.

(21) Appl. No.: 17/207,611

(22) Filed: Mar. 20, 2021

(65) Prior Publication Data

US 2022/0303720 A1 Sep. 22, 2022

(51) Int. Cl.
| | | |
|---|---|---|
| *H04W 4/021* | (2018.01) | |
| *H04W 64/00* | (2009.01) | |
| *H04W 4/029* | (2018.01) | |

(52) U.S. Cl.
CPC ........... *H04W 4/022* (2013.01); *H04W 4/029* (2018.02); *H04W 64/003* (2013.01)

(58) Field of Classification Search
CPC .................................................. H04W 64/003
See application file for complete search history.

(56) References Cited

U.S. PATENT DOCUMENTS

| | | | | |
|---|---|---|---|---|
| 2015/0067153 A1* | 3/2015 | Bhattacharyya | ........ | H04L 43/04 709/224 |
| 2017/0255696 A1* | 9/2017 | Pulitzer | .................. | G06F 16/40 |
| 2020/0053540 A1* | 2/2020 | Dames | ................. | H04L 67/143 |
| 2021/0258756 A1* | 8/2021 | Mcdougall | .............. | H04W 4/90 |

\* cited by examiner

Primary Examiner — Ernest G Tacsik
(74) Attorney, Agent, or Firm — USCH Law, PC

(57) ABSTRACT

A method of forecasting comprises, for each respective time period of a plurality of time periods, transforming a plurality of observations from the respective time period into observation sketches. The method then proceeds to extract a set of targeted attributes and constraints from a forecast request, and construct a set expression using the targeted attributes and the associated constraints. The method further comprises selecting one or more sample periods from the plurality of time periods, and for each sample period of the one or more selected sample periods: mapping the set of targeted attributes to observation sketches in the sample period to identify a subset of sketches, and performing a set operation on the subset of sketches using the set expression to determine a cardinality corresponding to the sample period; and generating a forecast result using one or more cardinalities corresponding to the one or more sample periods.

18 Claims, 16 Drawing Sheets

| Fence ID | Fence Type | Category | Name/Brand | Municipality | Spatial Data | Doc ID |
|---|---|---|---|---|---|---|
| 19-35175 | BC | General | Costco | US/CA/Almaden | a1, a2, ..., ai | 132475 |
| 19-35176 | BP | General | Costco | US/CA/Almaden | b1, b2, ..., bj | 135678 |
| 19-35177 | BR | General | Costco<br>TJ Maxx<br>Red Lobster<br>Trader Joe's<br>Chevy's<br>Barnes&Nobel<br>...<br>Almaden Plaza | US/CA/Almaden | c1, c2, ..., ck | 136572 |
| 19-35163 | BC | Department | TJ Maxx | US/CA/Almaden | d1, d2, ..., dl | 156321 |
| 19-35164 | BP | Department | TJ Maxx | US/CA/Almaden | e1, e2, ..., em | 154376 |
| 19-35151 | BC | Grocery | Trader Joe's | US/CA/Almaden | f1, f2, ..., fn | 256321 |
| | | ...... | ...... | ...... | ...... | |

FIG. 5

| Geo-Bock ID | Spatial Data | Meta Data | | | | |
|---|---|---|---|---|---|---|
| | | City/State | Functionality | Major POI | Demographic | inventory |
| ...... | ...... | ...... | ...... | ...... | ...... | ...... |
| 1234568 | a1, a2, ..., ai | Santa Clara/CA | Residential | Santa Clara High School | ...... | ...... |
| 1234569 | b1, b2, ..., bj | Santa Clara/CA | Retail | New India Bazar | ...... | ...... |
| 1234570 | c1, c2, ..., ck | Santa Clara/CA | Residential | Pomeroy Elementary | ...... | ...... |
| 1234571 | d1, d2, ..., dl | Santa Clara/CA | Retail | Moonlite Shopping Center | ...... | ...... |
| ...... | ...... | ...... | ...... | ...... | ...... | ...... |
| 1234573 | f1, f2, ..., fn | Santa Clara/CA | Recreational | Branham Park | ...... | ...... |
| ...... | ...... | ...... | ...... | ...... | ...... | ...... |

FIG. 7

| Request ID | Device Data | Mobile Entity Data | Time Stamp | Location Data | Other Info |
|---|---|---|---|---|---|

| Request ID | Time Stamp | Attribute 1 | Attribute 2 | ...... | Attribute i | ...... | Attribute j | ...... |
|---|---|---|---|---|---|---|---|---|

| Request ID | Time Stamp | | Device Information | | User Information | | | | Location | | | | | |
|---|---|---|---|---|---|---|---|---|---|---|---|---|---|---|
| | Day | Hour | UID | Device Type | Age | Gender | Ed | State | City | Brand | IP | Zip Code | ... |
| 0136...199 | 10/1/2020 | 11:55 | 36***412 | Samsung 1179 | 35 | M | G/S | CA | Los Altos | B175 | 3968 | ##### | ... |
| 0136...198 | 10/1/2020 | 11:53 | XX***XXX | Iphone 10 | 20 | F | HS | CA | SF | B138 | 5475 | ##### | ... |
| 0136...197 | 10/1/2020 | 11:53 | XX***XXX | Nokia 2300 | 25 | M | C/U | CA | SSF | B176 | 6812 | ##### | ... |
| 0136...196 | 10/1/2020 | 11:52 | XX***XXX | Nokia 4566 | 21 | F | HS | CA | Palo Alto | Null | 5596 | ##### | ... |
| 0136...195 | 10/1/2020 | 11:51 | 36***412 | Samsung 1179 | 19 | M | G/S | CA | Los Altos | B175 | 3968 | ##### | ... |
| ... | ... | ... | ... | ... | ... | ... | ... | ... | ... | ... | ... | ... | ... |
| 0125...852 | 10/1/2020 | 00:06 | XX***XXX | Samsung 1179 | 23 | F | C/U | CA | Los Gatos | B168 | 5469 | ##### | ... |
| 0125...851 | 10/1/2020 | 00:05 | XX***XXX | Iphone 11 | 18 | F | HS | CA | Menlo Park | Null | 1357 | ##### | ... |

FIG. 9

| Categories | Gender | | Audience (Age Range) | | | | Zip Code | | | Brand | | |
| --- | --- | --- | --- | --- | --- | --- | --- | --- | --- | --- | --- | --- |
| Attribute Values | M | F | Other | <20 | ... | >60 | ... | 94538 | 94539 | ... | xyz | ... |
| TP-1 SketchBin# | ### | ### | ### | ### | ... | ### | ... | ### | ### | ### | ### | ### |
| TP-2 SketchBin# | ### | ### | ### | ### | ... | ### | ... | ### | ### | ### | ### | ### |
| TP-3 SketchBin# | ### | ### | ### | ### | ... | ### | ... | ### | ### | ### | ### | ### |
| TP-4 SketchBin# | ### | ### | ### | ### | ... | ### | ... | ### | ### | ### | ### | ### |
| TP-5 SketchBin# | ### | ### | ### | ### | ... | ### | ... | ### | ### | ### | ### | ### |
| ... | ... | ... | ... | ... | ... | ... | ... | ... | ... | ... | ... | ... |
| TP-n SketchBin# | ### | ### | ### | ### | ... | ### | ... | ### | ### | ### | ### | ### |
| ... | ... | ... | ... | ... | ... | ... | ... | ... | ... | ... | ... | ... |

FIG. 12A

Sketch Bins

| Bin # | Gender/Male |
|---|---|
| Observation Signatures | 11001...1100101 |
| | 11001...0010010 |
| | ... |
| | 10100...0010100 |
| | 10001...1010110 |
| | ... |
| | 10000...0000110 |
| | 00000...0000000 |

⋮

| Bin # | Zip Code/94538 |
|---|---|
| Observation Signatures | 11000...1000101 |
| | 10000...0000110 |
| | ... |
| | 00000...0000000 |
| | 00000...0000000 |
| | ... |
| | 00000...0000000 |
| | 00000...0000000 |

⋮

| Bin # | Brand/In-N-Out |
|---|---|
| Observation Signatures | 11001...1000101 |
| | 11001...0010100 |
| | ... |
| | 10000...0010100 |
| | 10000...0000110 |
| | ... |
| | 00000...0000000 |
| | 00000...0000000 |

SYSTEM AND METHOD OF FORECASTING BASED ON PERIODICAL SKETCHING OF BIG DATA OF OBSERVATIONS

FIELD

The present disclosure is related to location-based information and big data technologies, and more particularly to system and method of forecasting based on periodical sketching of big data of observations of mobile signals.

DESCRIPTION OF RELATED ART

Mobile device locations are becoming more commonly available to mobile service providers. Location-based information technologies for selective delivery of information to mobile devices based on their locations and other characteristics are rapidly developing. To make use of the massive quantities of mobile signals, big data technologies have been developed to effectively translate mobile device locations and other characteristics into meaningful indicators such as interests and patterns, which can be used to improve content delivery in the process of providing mobile services. Among these technologies are machine learning and various statistical methods. These methods are useful in many applications but can be exorbitantly expensive and time consuming to be practical in some situations.

SUMMARY

According to some embodiments, observations in the form of a large number (e.g., hundreds of millions or billions) of datasets are obtained based on mobile signals associated with millions of mobile devices communicating with a packet-based network. A respective dataset identifies an associated mobile device, and includes a respective time stamp, and a respective set of features or attributes, which often take on categorical values. In some embodiments, a large number of bid requests are generated from mobile signals associated with mobile devices, and the large number of data sets are derived from the large number of bid requests, which form the supply or platform for mobile information delivery. Thus, being able to quickly and accurately forecast mobile supply inventory (e.g., a number of bid requests with certain attribute constraints) is important for mobile information services.

In some embodiments, a forecasting system comprises one or more processors having access to the big data of observations, and a non-transitory computer readable medium storing therein program logic executable by the one or more processors, the program logic comprising a sketch generator configured to, for each respective time period of a plurality of time periods, transform a plurality of observations having time stamps in the respective time period into a set of observation sketches in the respective time period. Each particular observation sketch in the set of observation sketches is associated with a particular attribute value and includes hash signatures of at least some observations among the plurality of observations. Each of the at least some observations has at least one attribute that corresponds to the particular attribute value. Thus, the particular observation sketch captures characteristics that are related to the particular attribute value in the big data of observations. In some embodiments, the set of observation sketches summarize characteristics related to a set of attribute values in the big data of observations for subsequent cardinality determination with regard to certain forecast constraints.

The program logic further comprises a request parser configured to receive a forecast request including forecast constraints, and to parse the forecast request to extract a set of targeted attributes from the forecast constraints; and a set expression construction module to construct a set expression of the forecast constraints using the set of targeted attributes. In some embodiments, the set expression includes the set of targeted attributes and one or more logic operators (e.g., relational algebraic operators) interrelate the set of targeted attributes.

In some embodiments, the program logic further comprises a sketch operator configured to select one or more sample periods from the plurality of time periods, and to, for each sample period of the one or more selected sample periods: map the set of targeted attributes to sketches of observations in the sample period to identify a subset of sketches corresponding, respectively, to the set of targeted attributes; and perform a set operation on the subset of sketches using the set expression to determine a cardinality corresponding to the sample period. In some embodiments, the program logic further comprises a result generation module configured to generate a forecast result based on one or more cardinalities corresponding to the one or more sample periods.

In some embodiments, the sketch generator comprises an attribute definition module configured to determine a plurality of categorical attribute values; a base sketch allocation module configured to, for each of the plurality of time periods, allocate a plurality of sketch bins corresponding, respectively, to the plurality of categorical attribute values; and sketch bin population module configured to populate the plurality of sketch bins for the respective time period with respective signatures of observations. In some embodiments, the plurality of categorical attribute values is associated with a plurality of categories of attributes, each category having one or more categorical attributes, and each categorical attribute having one or more categorical attribute values.

In some embodiments, the sketch generator further comprises a parser configured to, for each respective observation of the plurality of observations, parse the respective observation to determine a plurality of attribute values; and a hashing module configured to apply a hash function to the respective observation to obtain a respective signature of the respective observation. In some embodiments, the sketch bin population module is configured to, for each respective attribute value of the plurality of attribute values in the respective observation, determine a corresponding sketch bin and populating the corresponding sketch bin with the respective signature. In some embodiments, the hashing module is configured to generate one or more hashed values of an observation ID as the respective signature. In some embodiments, the one or more hashed values are generated by applying one or more hashed functions on the observation ID multiple times.

In some embodiments, each of the plurality of time periods has a duration equal to that of, e.g., one day. In some embodiments, a duration of the sample period is equal to, e.g., a duration of each of the plurality of time periods. In some embodiments, the plurality of observations includes a large number (e.g., millions, or billions) of observations. In some embodiments, each of the large number of observations include a number (e.g., dozens or hundreds) of attributes.

A method of forecasting is carried out at one or more computer systems having access to the big data of observations. The method comprises, for each respective time period of a plurality of time periods, transforming a plurality of observations having time stamps in the respective time period into a set of sketches of observations in the respective time period, whereby each particular sketch in the set of sketches is associated with a particular attribute value and includes signatures of at least some observations among the plurality of observations, each of the at least some observations having at least one attribute that corresponds to the particular attribute value.

The method further comprises receiving a forecast request, the forecast request including forecast constraints; extracting a set of targeted attributes from the forecast constraints; and construct a set expression of the forecast constraints using the set of targeted attributes. In some embodiments, the set expression includes the set of targeted attributes and one or more logic operators interrelate the set of targeted attributes.

The method further comprises selecting one or more sample periods from the plurality of time periods; and for each sample period of the one or more selected sample periods: mapping the set of targeted attributes to sketches of observations in the sample period to identify a subset sketches corresponding, respectively, to the set of targeted attributes; performing a set operation on the subset of sketches using the set expression to determine a cardinality corresponding to the sample period; and generating a forecast result based on one or more cardinalities corresponding to the one or more sample periods.

In some embodiments, the method further comprises selecting a plurality of categorical attribute values; and for each of the plurality of time periods, allocating a plurality of sketch bins corresponding, respectively, to the plurality of categorical attribute values. In some embodiments, transforming a plurality of observations having time stamps in the respective time period into a set of sketches of observations in the respective time period includes populating the plurality of sketch bins for the respective time period with respective signatures of observations.

In some embodiments, populating the plurality of sketch bins for the respective time period with respective ones of the set of sketches comprises, for each respective observation of the plurality of observations: applying a hash function to the respective observation to obtain a respective signature of the respective observation; parsing the respective observation to determine a plurality of attribute values in the respective observation; and for each respective attribute value of the plurality of attribute values in the respective observation, determining a corresponding sketch bin and populating the corresponding sketch bin with the respective signature.

In some embodiments, applying a hash function to the respective observation comprises generating a hashed value of an observation ID as the respective signature.

BRIEF DESCRIPTION OF THE DRAWINGS

FIG. 5 is a table illustrating some of the examples of geo-fences in a geo-fence database according to certain embodiments.

FIG. 7 is a table illustrating examples of geo-blocks in a geo-block database according to certain embodiments.

FIGS. 8A-8B are block diagrams illustrating a received bid request and a processed bid request, respectively, according to certain embodiments.

FIG. 9 is a table illustrating examples of entries in a request log according to certain embodiments.

FIGS. 12A-12B are tables illustrating allocation of sketch bins and examples of sketch bins, respectively, according to certain embodiments.

DESCRIPTION OF THE EMBODIMENTS

Several aspects of the present disclosure directly improve computer functionality. For instance, embodiments of the present disclosure achieve faster forecasting with smaller memory and processing requirements by transforming massive numbers of observations into categorical sketches in single pass over the data representing the massive number of observations, and by operating on the categorical sketches to obtain forecast results. The embodiments achieve efficient use of computer resources and improved forecasting performance, as compared to conventional methods of forecasting, which involve machine training sophisticated models by parsing through billions of observations, or fitting a Poisson-like statistical model to a gigantic population size, or some other brute force methods that often require multiple-passes over the related data. These conventional methods are either not feasible or too expensive or too time consuming to be practical for forecasting mobile supplies.

Figure 1:
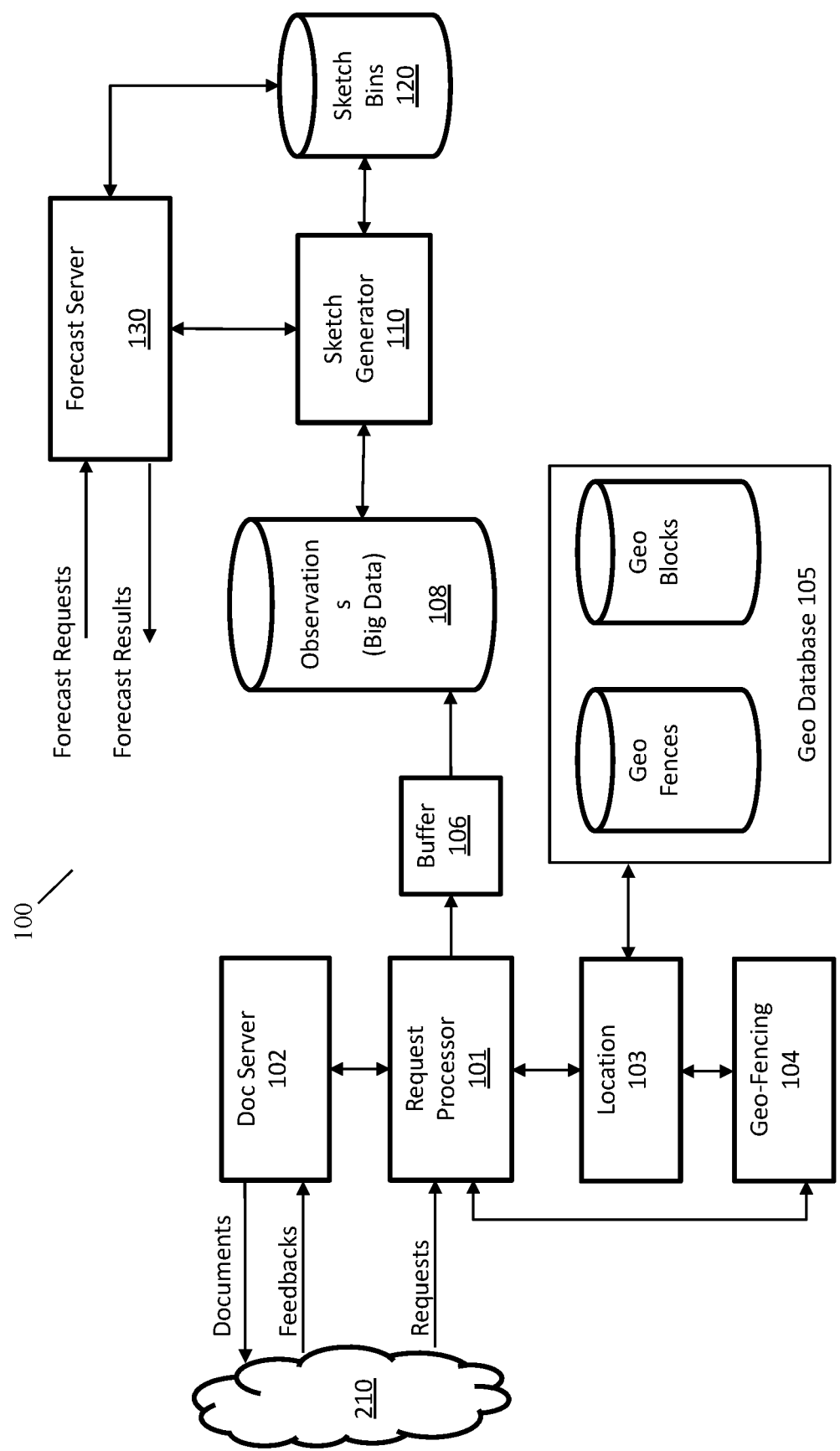
FIG. 1 includes a diagrammatic representation of a forecasting system according to certain embodiments.

FIG. 1 is a diagrammatic representation of a forecasting system 100 according to certain embodiments. System 100 is coupled to a packet-based network 210 and is coupled to, or includes, a request processor 101 configured to receive and process bid requests from the packet-based network, and an information server (doc server) 102 configured to serve information to mobile devices communicating with the packet-based network 210 based on processed requests from the request processor 101. In some embodiments, the request processor is coupled to a location module 103 configured to determine a location of a mobile device based on a received bid request and a geo-fencing module 104, which includes or has access to a geo database 105 storing therein data associated with geo-places. The geo-fencing module is configured to detect location events with respect to the geo places in the geo database 105 based on the locations determined by the location module. The processed requests including their respective location events and other attributes are buffered in a buffer 106 and stored in a database 108.

In certain embodiments, the geo-places include geo-fences corresponding to various places (or points) of interests (POIs), and may further include geo-blocks corresponding to geographical regions bordering public roads and/or natural boundaries.

As shown in FIG. 1, in some embodiments, the forecasting system 100 includes a sketch generator 110 having access to the database 108 and configured determine a plurality of categorical attribute values based on some of the observations stored in the database 108, and to allocate in a sketch database 120 a plurality of sketch bins corresponding to respective ones of the plurality of categorical attribute values. In some embodiments, the sketch generator 110 is further configured to, for each respective time period of a plurality of time periods, transform a plurality of observations having time stamps in the respective time period into a set of observation sketches in the respective time period. Each particular observation sketch in the set of observation sketches is associated with a particular attribute value and includes signatures of at least some observations among the plurality of observations, each of the at least some observations having at least one attribute that corresponds to the particular attribute value.

In some embodiments, the forecasting system 100 further includes a forecast server 130 coupled to the sketch generator 110 and/or the sketch database 120, and configured to receive a forecast request from a forecast requestor, the forecast request including forecast constraints. The forecast server 130 is further configured to parse the forecast request to extract a set of targeted attributes from the forecast constraints, and to construct a set expression of the forecast constraints using the set of targeted attributes. In some embodiments, the set expression includes the set of targeted attributes and one or more logic operators (e.g., relational algebraic operators) interrelate the set of targeted attributes.

In some embodiments, the forecast server 130 is further configured to select one or more sample periods from the plurality of time periods, and to, for each sample period of the one or more selected sample periods: map the set of targeted attributes to sketches of observations in the sample period to identify a subset of sketches corresponding, respectively, to the set of targeted attributes; and perform a set operation (e.g., relational algebraic operations) on the subset of sketches using the set expression to determine a cardinality corresponding to the sample period. In some embodiments, the forecast server is further configured to generate one or more forecast results based on one or more cardinalities corresponding to the one or more sample periods, and to transmit the forecast results to the forecast requestor.

Figure 2:
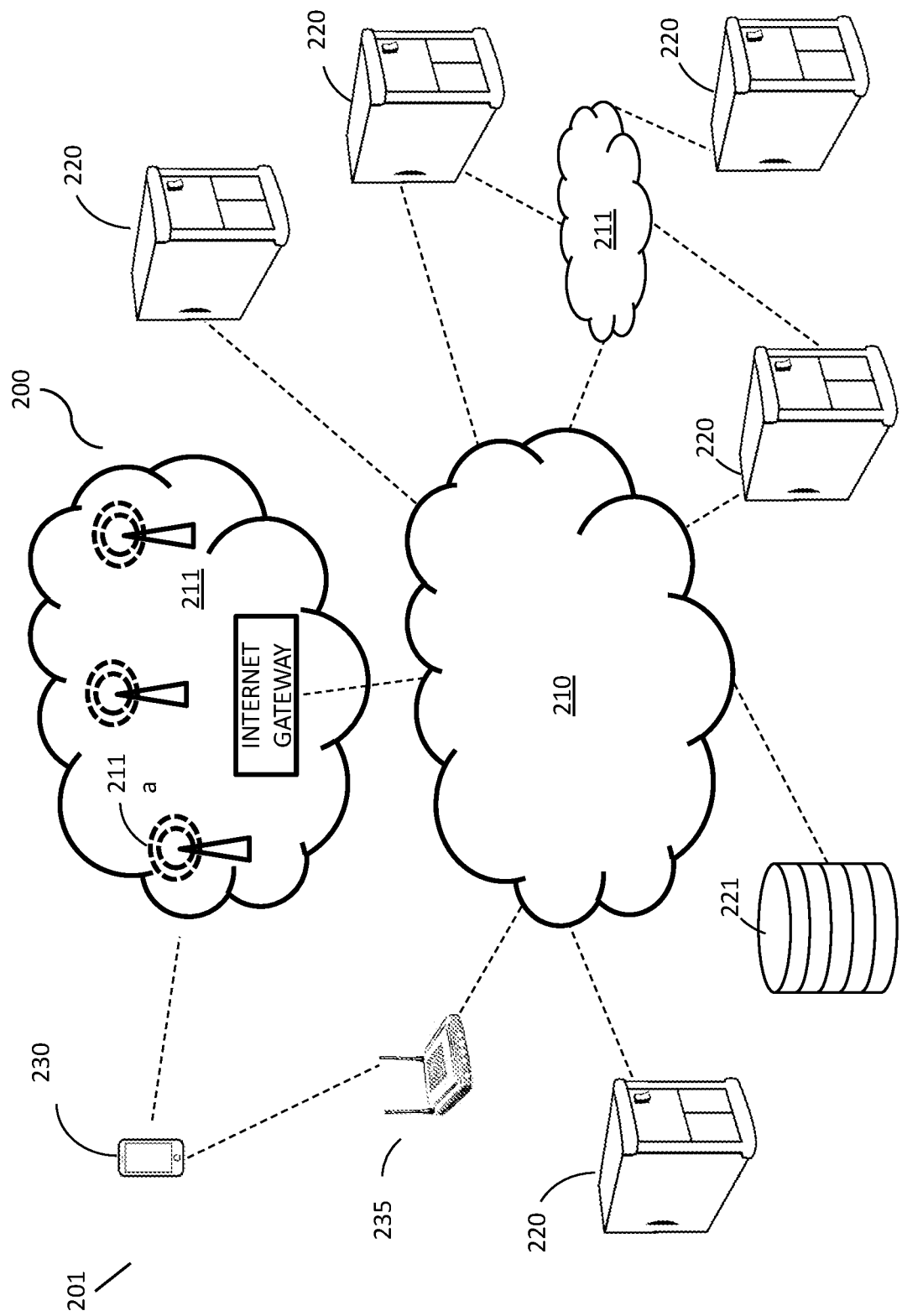
FIG. 2 is a diagrammatic representation of an environment in which the forecasting system operates according to certain embodiments.

FIG. 2 is a schematic diagram illustrating an overview of an environment 201 in which some embodiments of the disclosed technology may operate. Environment 201 can include one or more computer systems 220 coupled to a packet-based network 200. The packet-based network 200 in certain embodiments includes, e.g., the Internet 210 and part or all of a cellular network 211 coupled to the Internet 210 via an Internet Gateway. The computers/servers 220 can be coupled to the Internet 210 using wired Ethernet and optionally Power over Ethernet (PoE), WiFi, and/or cellular connections via the cellular network 211 including a plurality of cellular towers 211*a*. The network may also include one or more network attached storage (NAS) systems 221, which are computer data storage servers connected to a computer network to provide data access to a heterogeneous group of clients, and which can be used to as the database 108 or 120. As shown in FIG. 2, one or more mobile devices 230 such as smart phones or tablet computers are also coupled to the packet-based network via cellular connections to the cellular network 211. When a WiFi hotspot (such as hotspot 235) is available, a mobile device 230 may connect to the Internet 210 via a WiFi hotspot 235 using its built-in WiFi connection. Thus, the mobile devices 230 may interact with computers/servers 220 coupled to the Internet 210. A mobile device 230, or its user, or anyone or anything associated with it, or any combination thereof, is sometimes referred to herein as a mobile entity.

Figure 3:
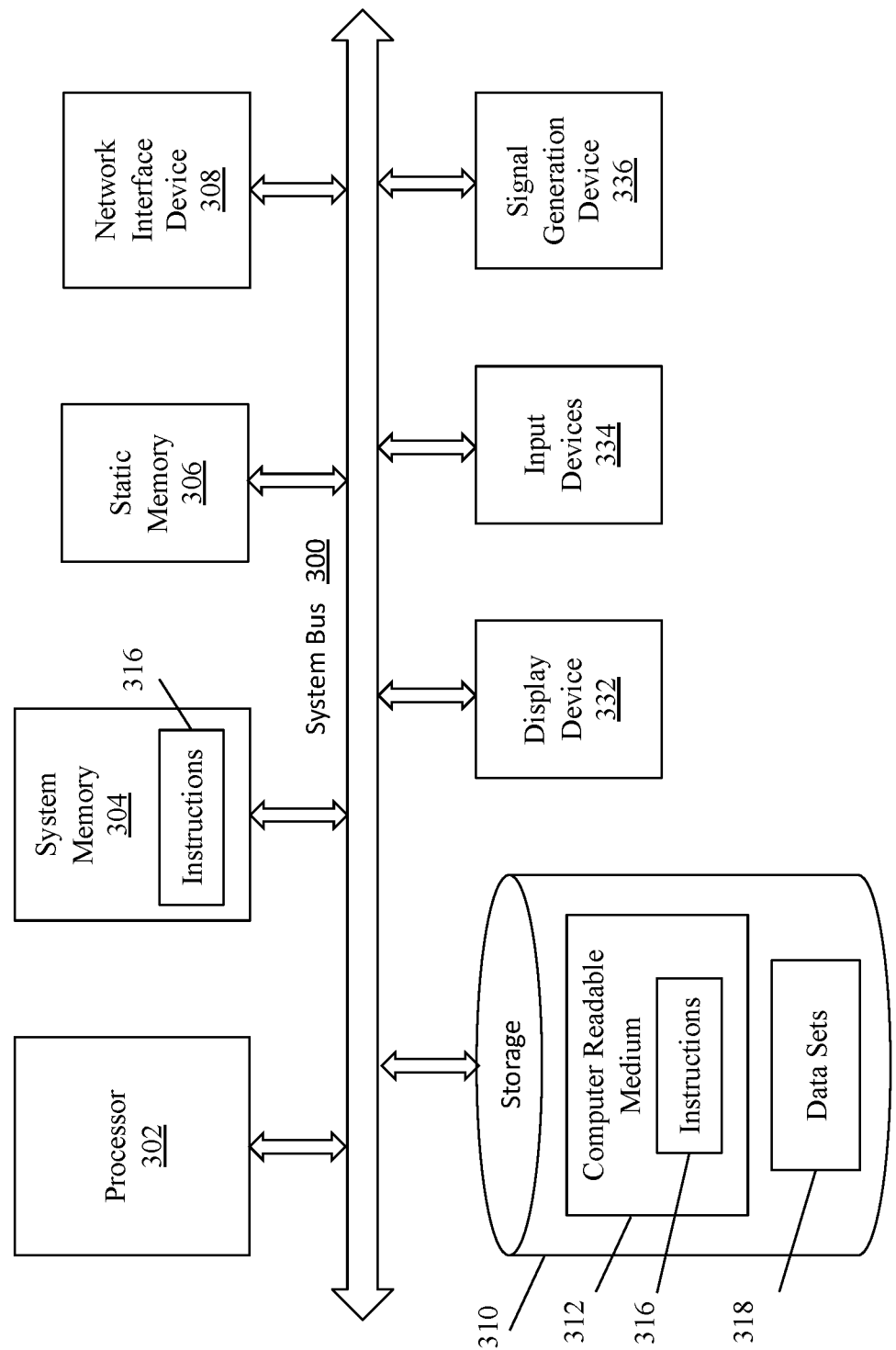
FIG. 3 is a diagrammatic representation of a computer/server that performs one or more of the methodologies and/or to provide part or all of the forecasting system according to certain embodiments.

FIG. 3 illustrates a diagrammatic representation of a computer/server 220 according to certain embodiments. The computer/server 220 may operate as a standalone device or as a peer computing device in a peer-to-peer (or distributed) network computing environment. As shown in FIG. 3, the computer/server 220 includes one or more processors 302 (e.g., a central processing unit (CPU), a graphic processing unit (GPU), and/or a digital signal processor (DSP)) and a system or main memory 304 coupled to each other via a system bus 300. The computer/server 220 may further include static memory 306, a network interface device 308, a storage unit 310, one or more display devices 330, one or more input devices 334, and a signal generation device (e.g., a speaker) 336, with which the processor(s) 302 can communicate via the system bus 300.

In certain embodiments, the display device(s) 330 include one or more graphics display units (e.g., a plasma display panel (PDP), a liquid crystal display (LCD), a projector, or a cathode ray tube (CRT)). The input device(s) 334 may include an alphanumeric input device (e.g., a keyboard), a cursor control device (e.g., a mouse, trackball, joystick, motion sensor, or other pointing instrument). The storage unit 310 includes one or more machine-readable media 312 on which are stored instructions 316 (e.g., software) that enable anyone or more of the systems, methodologies or functions described herein. The storage unit 310 may also store data sets 318 (e.g., sketch bins, and/or observations) used and/or generated by the forecast system 100. The instructions 316 (e.g., software) may be loaded, completely or partially, within the main memory 304 or within the processor 302 (e.g., within a processor's cache memory) during execution thereof by the computer/server 220, and may include program logic. In some embodiments, the program logic includes the sketch generator 110 and/or various functions of the forecast server 120, as discussed further below.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

The forecast system 100 according to certain embodiments can be implemented using one or more computers/servers 220 executing programs to carry out the functions and methods disclosed herein. It should be understood that the example embodiments described herein may be implemented in many different ways. In some instances, the various servers and/or modules in FIG. 1, e.g., the request processor 101, the document server 122, the location module 103, the geo-fencing module 104, the sketch generator 120, and the forecast server, as described herein, may be implemented by one or more computers/servers 220, respectively, collectively, or in various combinations. In some embodiments, the one or more computers/servers may be general purpose computers/servers that are transformed into the machines that execute the methods described herein, for example, by loading software instructions into one or more data processors, and then causing execution of the instructions to carry out the functions, processes, and/or methods described herein. As shown in FIG. 2, some of the computers/servers 220 are coupled to each other via a local area network (LAN) 210, which in turn is coupled to the Internet 210. Also, each computer/server 220 referred herein can include any collection of computing devices.

According to certain embodiments, as shown in FIG. 1, the request processor 101 receives requests from the packet-based network 200. These requests may be generated by one or more computers/servers 220 in the packet-based network as they provide mobile services to the mobile devices. In certain embodiments, a request often includes location data, and the location module 103 is configured to determine whether the location data include a reliable latitude/longitude (LL) pair, and if the request does not include a reliable LL pair, the location module 103 would proceed to derive the location of the associated mobile device from the location data. The geo-fencing module 104 is configured to determine if the detected mobile device location triggers any geo-place(s) in the geo-database 105 and returns the triggered geo-place(s) to the request processor 101. In certain embodiments, the geo-places include geo-fences and may further include geo-blocks, and the geo database 105 is a spatial database optimized for storing and querying data that represent geographical areas or spaces, and may include spatial data and meta data associated with each of the geographical areas or spaces.

Figure 4:
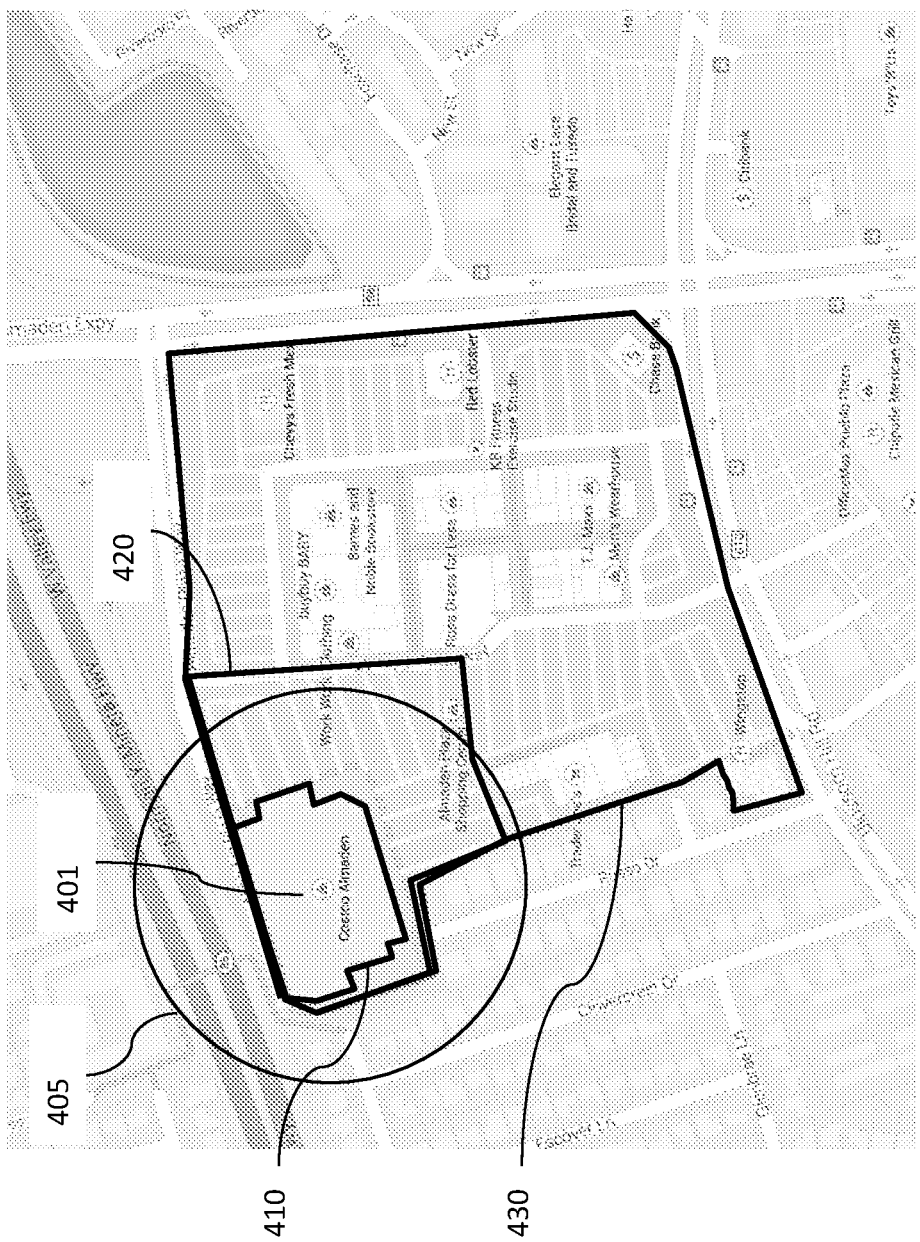
FIG. 4 is a map overlay illustrating examples of geo-fences in a geographical region according to certain embodiments.

In certain embodiments, the geo-fences in the geo database 115 include spatial data representing virtual perimeters of defined areas or places that mirror real-world geographical areas associated with various entities and/or brands. As shown in FIG. 4, a defined area according to certain embodiments can be a static circle 405 around a business location 401, e.g. a fence obtained using offline index databases such as InfoUSA (www.infousa.com), which provides a list of POIs and their locations, or areas specified by marketers using predefined boundaries, such as neighborhood boundaries, school attendance zones, or parcel boundaries, etc.

In certain embodiments, the defined areas include one or more geo-fences for each of a plurality of points of interests in consideration of the map data around the POI. For example, as shown in FIG. 4, one or more polygons can be defined for a business location 401 to be in conformity with the real-world geographical structure and boundaries of the business and its surroundings, such as a first polygon 410 around the building of the business, a second polygon 420 around the building and its parking lot, and/or a third polygon 430 around a shopping area or business region including the business and other points of interests (POIs). In certain embodiments, these different types of geo-fences are defined for a point of interest (POI) to indicate different levels of intentions, interests, and/or behavior, etc., of a mobile user with respect to the POI, which can be used as derive one or more attributes from the request.

FIG. 5 illustrates examples of some of the geo-fences in the geo database 115, according to certain embodiments. As shown, the site Costco in Almaden has three different types of geo-fences associated with it—geo-fence with Fence ID 19-35175 corresponds to a business center (BC), which is defined by a polygon around the store building and represented by spatial index a1, a2, ..., ai; geo-fence with Fence ID 19-35176 corresponds to a polygon around the site's larger premise including its parking lot and represented by spatial index b1, b2, ..., bj; and geo-fence with Fence ID 19-35177 corresponds to polygon around the shopping center including the store and other POIs and represented by spatial index c1, c2, ..., ck. Note that geo-fence with Fence ID 19-35177 is also associated with the names/brands of other POIs in the shopping center, as well as name of the shopping center itself. FIG. 5 also shows that the site T. J. Maxx is associated with Fence ID 19-35177 and also has two other types of fences associated with it, and the site Trader Joe's is also associated with Fence ID 19-35177 and has at least a business center place associated with it. As shown in FIG. 5, each geo-fence entry in the geo database 115 includes the spatial data associated with the respective place together with some meta data about the respective place, such as, for example, one or more names/brands associated with the place, a category of the place, a place identifier identifying a particular locale (e.g., city, district, etc.) for the place, the place type, and/or one or more doc IDs identifying one or more information documents (e.g., one or more html/JavaScript files) associated with the names/brands or the place. In most cases, a POI's name is established as its brand, so they are used interchangeably. For ease of discussion, the brand of a POI is referred to hereafter as either the name or the brand of the POI, whichever is associated with the POI in the geo-fence database.

Figure 6:
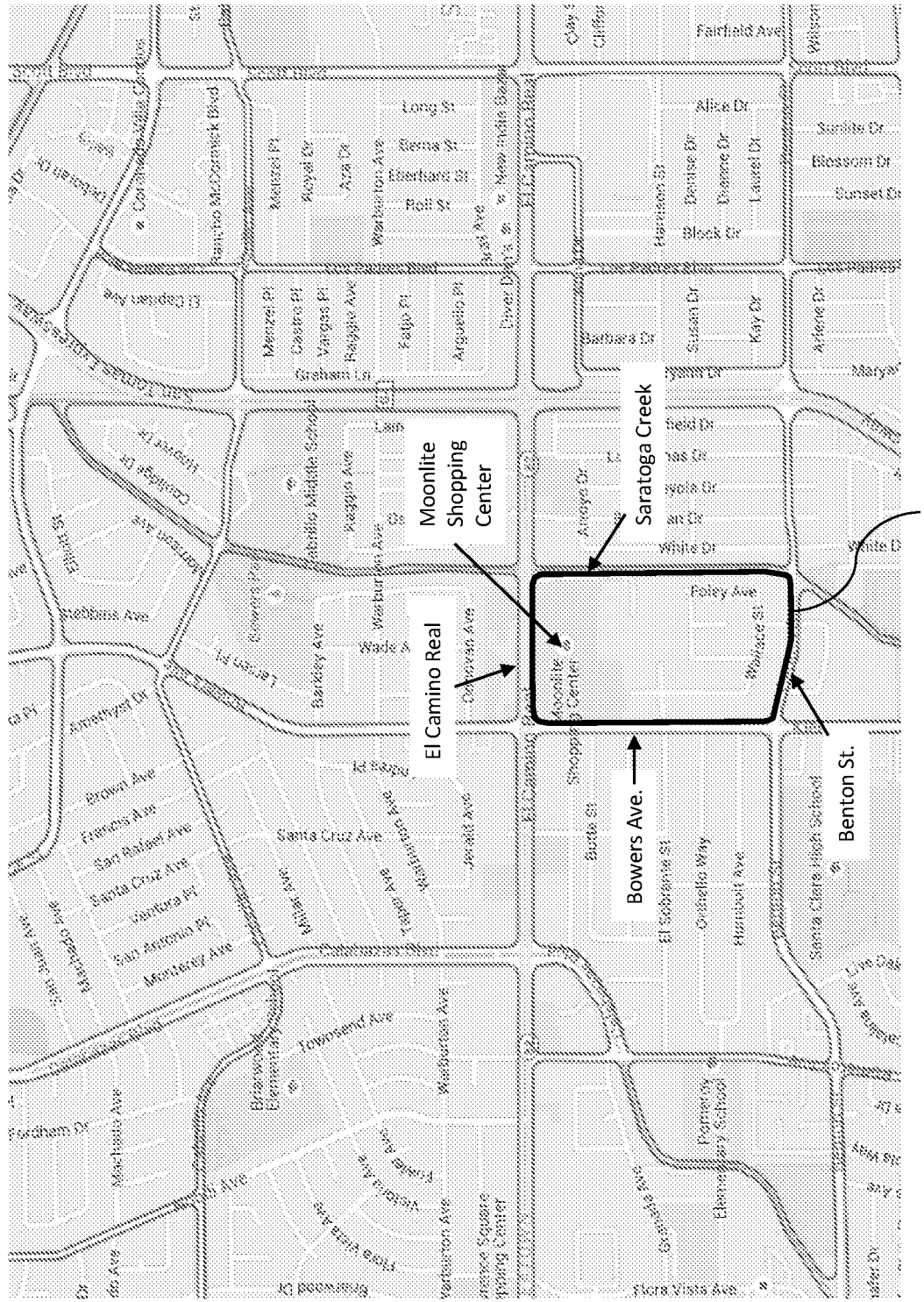
FIG. 6 is a map overlay illustrating examples of geo-blocks in a geographical region according to certain embodiments.

In certain embodiments, the geo-blocks in the geo database 115 represent geographical regions with natural boundaries such as major roads, shorelines, mountain ranges, etc., as described in further detail below. FIG. 6 illustrates graphically exemplary geo-blocks according to certain embodiments. In this example, for an area in the city of Santa Clara, Calif., the geo-blocks are shown as outlined in boundaries overlaid on top of a map for the area, taken from, for example, Google Map, and the boundaries of the geo-blocks are mostly aligned with major roads and natural boundaries, taking into account the road width so as to exclude mobile signals from travelers on the major roads.

For example, geo-block 601 containing the Moonlite Shopping Center is shown to be bordered on three sides by major roads, El Camino Real, Bowers Ave, and Benton St., respectively, and on another side by the Saratoga Creek. Each of the geo-blocks shown in FIG. 6 can be further partitioned into more granular blocks bordered by smaller roads. Real world entities present in these geo-blocks tend to serve common functional purposes (residential, retail etc.), and these blocks form the foundation for the construction of boundaries that are highly indicative of location dependent attributes such as intention and demographics. FIG. 7 illustrates examples of some of the geo-blocks in the geo database 115, according to certain embodiments. As shown, each geo-block includes spatial data defining the boundary of the geo-block and meta data including, for example, the city/state in which the geo-block is located, the functionality of the geo-block (e.g., residential, retail, recreational, educational, etc.), one or more major POIs in the geo-block, as well as other information such as demographic of the residents or visitors of the geo-block, and inventory of requests with location data in the geo-block, etc., which can be derived from logged request data.

In certain embodiments, as shown in FIG. 8A, the request processor 101 receives a request 801 presented by, for example, a server run by a mobile service provider (MSP or MSP server), or an ad exchange (or exchange), via the network 200. The request 801 is associated with a mobile device and includes a request ID, mobile device data such as mobile device ID, maker/model, operating system, etc., mobile entity data such as user ID (UID), age, gender, income bracket, education level, etc., mobile device location data including a plurality of location components, such as latitude and longitude coordinates (LL), IP addresses (IP), postal or zip codes (ZC), and/or city-state names (CS), etc. The request may further include other information.

In certain embodiments, the location module 103 determines the location of the mobile device using the location data, and the geo-fencing module 104 queries the geo database 105 to determine whether the location triggers one or more geo-places in the geo database 105, and returns information about the triggered geo-place(s) (e.g., brand name of a triggered POI) to the request processor. In certain embodiments, as shown in FIG. 8B, the request server generates an observation 810 including the request ID of the request 801 and a set of attributes determined based on information in the request 801 and any triggered brands, and outputs the observation 810 to the information server 102, which determines whether to server certain information based on the set of attributes, and to the buffer 106, which buffers and outputs the observation 810 to the database 108.

FIG. 9 is a table illustrating exemplary entries (or observations in the form of datasets) in the database 108, according to certain embodiments. As shown in FIG. 9, each observation and dataset in the database 108 corresponds to a respective processed request and includes request ID, a time stamp in the form of, e.g., day and hour, and a plurality of attributes. Each attribute has a attribute value in a category (e.g., mobile device or user ID or UID, mobile device type such as make/model, mobile user age, gender, education, etc., mobile device location indicators such as state, city, any triggered brand(s), IP address, zip code, etc., and so on. In some embodiments, the observations in the database 108 are organized in the order of their respective time stamps, as shown in FIG. 9. In some embodiments, there can be billions of observations stored in the database 108 in a single day. Thus, the observations accumulated in database 108 over the course of days or weeks or months form the big data of observations, which is utilized according to certain embodiments to forecast mobile inventories.

In certain embodiments, the set of attributes may include other attributes derived from the received request, such as, e.g., name or type of an application program running on the mobile device, one or more keywords suggesting types of information for returning to the mobile device, and/or other information associated with the mobile user, the mobile device, and/or the MSP. In some cases, the location data can trigger multiple places. For example, as shown in FIG. 4, a request that triggers a business region 430 (e.g., a retail center or shopping mall) or a geo-block 601 could trigger any of the POIs in the same business region or geo-block as well as. Thus, the set of attributes may include multiple brands in the same business region or geo-block as well as the business region or geo-block itself.

Figure 10:
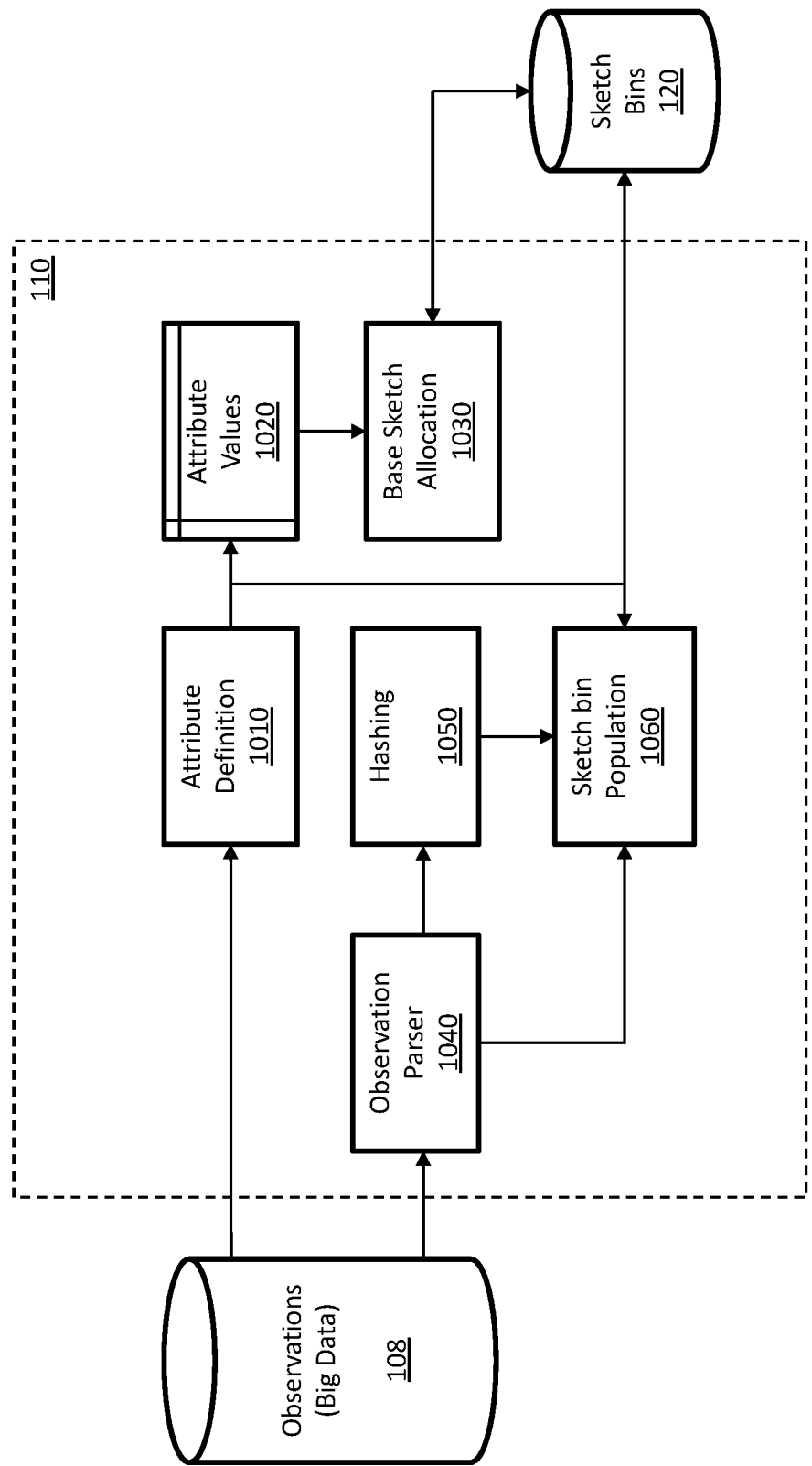
FIG. 10 is a block diagram of a sketch generator according to certain embodiments.
Figure 11:
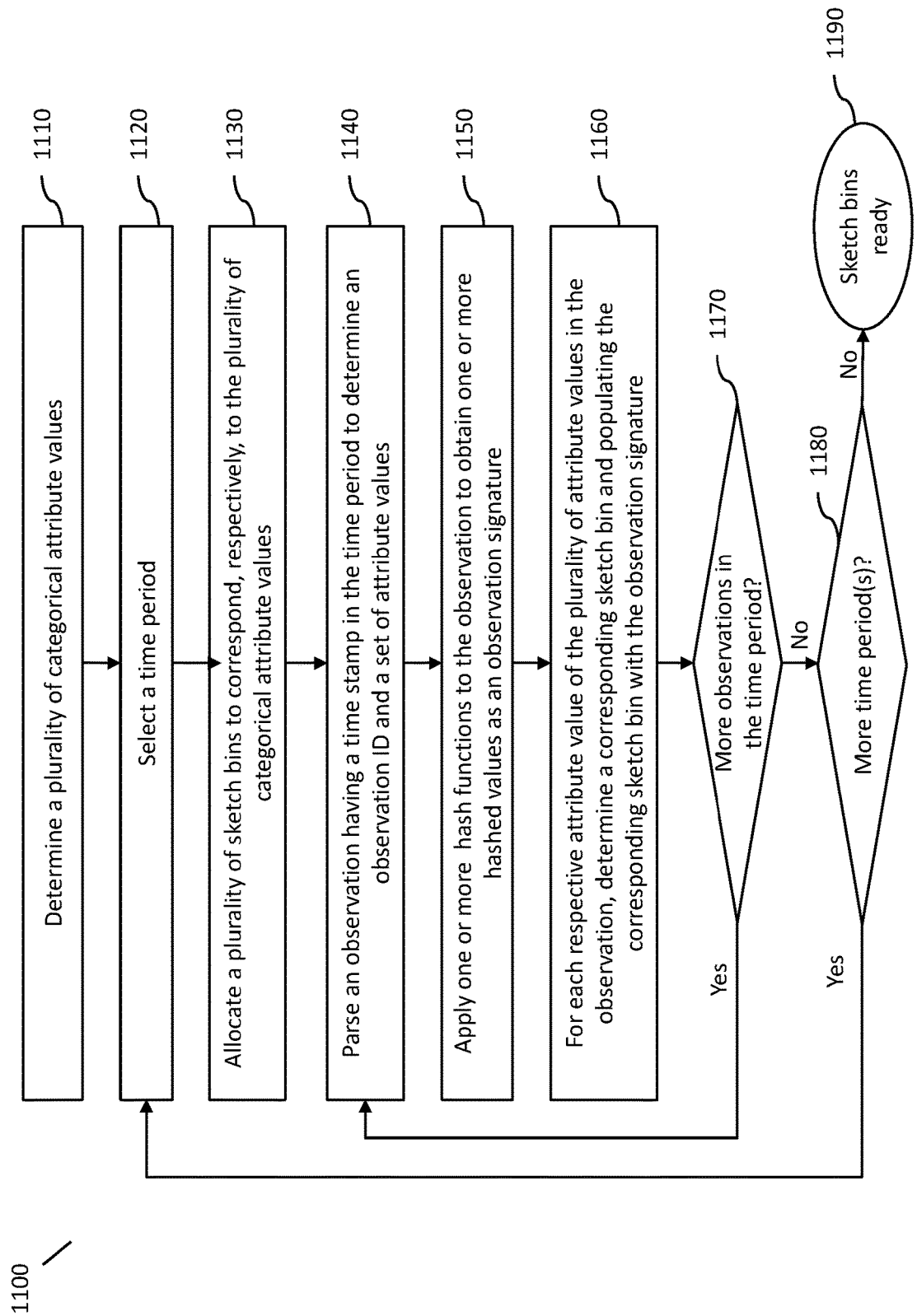
FIG. 11 is a flowchart illustrating a method performed by the sketch generator according to come embodiments.

As shown in FIG. 10, according to certain embodiments, the sketch generator 110 includes an attribute definition module 1010, a attribute database 1020, a base sketch allocation module 1030, a parser 1040, a hashing module 1050, and a sketch bin population module 1060. FIG. 11 illustrate a sketch generation process 1100 carried out by the sketch generator 110 according to some embodiments. As shown in FIGS. 10 and 11, the attribute definition module 1010 is configured to determine (1110) a plurality of categorical attribute values. For example, the plurality of attribute values can include a predetermined number of common attribute values determined by sampling a number of observations in the database 108, and/or a number of attribute values commonly found in forecast requests. As shown in FIG. 12A, the plurality of categorical attribute values can include different values (e.g, male, female, etc.) for the gender category, different age ranges (e.g., younger than 20, between 20 and 30 or {20, 30}, . . . , older than 60, etc.) for the audience category, different zip codes for the zip code category, different brand names for the brand category, etc.

In some embodiments, the base sketch allocation module 1030 is configured to, for each selected time period (1120) of a plurality of time periods (e.g., TP-1, TP-2, TP-n, . . . ), allocate (1130) a plurality of sketch bins in the sketch database 120 corresponding, respectively, to the plurality of categorical attribute values. The plurality of time periods can be, for example, consecutive days, or selected days, in the past month or months. FIG. 12A also shows the sketch bins identified by their respective sketch bin numbers allocated for the corresponding attribute values for each of the plurality of time periods. The attribute values and their corresponding sketch bin numbers, as shown in FIG. 12A, can be stored in an attribute database 1020 and/or in the sketch database 120.

In some embodiments, the parser 1040 is configured to read (1140) from the database 108 a respective observation having a time stamp in the selected time period, and to parse the respective observation to determine an observation ID (e.g., request ID) and a set of attribute values. The hashing module 1050 is configured to apply (1150) one or more hash functions to the respective observation to obtain one or more hashed values as a respective signature of the respective observation. The sketch bin population module 1060 is configured to, for each respective attribute value of the set of attribute values in the respective observation, determine a corresponding sketch bin and populating (1160) the corresponding sketch bin with the respective signature. In some embodiments, the hashing module 1050 is configured to apply multiple hash functions to the observation ID or to apply one or more hash functions to the observation ID multiple times to generate multiple hashed values as the respective signature.

As shown in FIG. 11, upon determining (1170) that there are more observations in the selected time period, the parser (1040) continues to read (1140) the next observation with a time stamp in the selected time period, the hashing module 1050 continues to apply 1150 the one or more hashing functions to the next observation to obtain a signature of the next observation, and the sketch bin population module 1060 continues to populate 1160 the sketch bins corresponding to attribute values that are in the next observation with the signature of the next observation, and so on, till all or a sufficient or predetermined number of observations from the selected time period have been read from the database 108, or till the sketch bins for the selected time period are sufficiently populated according to predetermined criteria.

As shown in FIG. 11, upon determining (1180) that there are additional period(s) in the plurality of time periods for sketching, the base sketch allocation module 1030 would proceed to allocate (1130) for a next selected time period another plurality of sketch bins in the sketch database 120 corresponding, respectively, to the plurality of categorical attribute values, and process 1100 would reiterate through steps 1140, 1150 and 1160 for the next selected time period.

Thus, process 1100 continues till the observation sketches for each of the plurality of time periods are generated.

FIG. 12B illustrate examples of sketch bins in the sketch database 120 according to certain embodiments. As shown in FIG. 12B, each sketch bin has a base sketch including a bin number and may further include the category (e.g., gender) and/or attribute value (e.g., male) corresponding to the sketch bin. The base sketch further includes a plurality of storage slots or storage spaces to store observation signatures. Each storage slot or space is structured to hold an observation signature, which can be in the form of one or more bit strings. The storage slots or spaces can be initially set to hold "0" bit values, and as the process 1100 is carried out, more and more storage slots in a sketch bin are replaced with signatures of observations that have the same attribute value corresponding to the sketch bin.

In some embodiments, each of the plurality of time periods has a duration equal to that of, e.g., one day. In some embodiments, the database 108 can store a large number (e.g., millions, or billions) of observations in each time period (e.g., a day). In some embodiments, each of the large number of observations may include a number (e.g., hundreds or thousands) of attributes.

Figure 13:
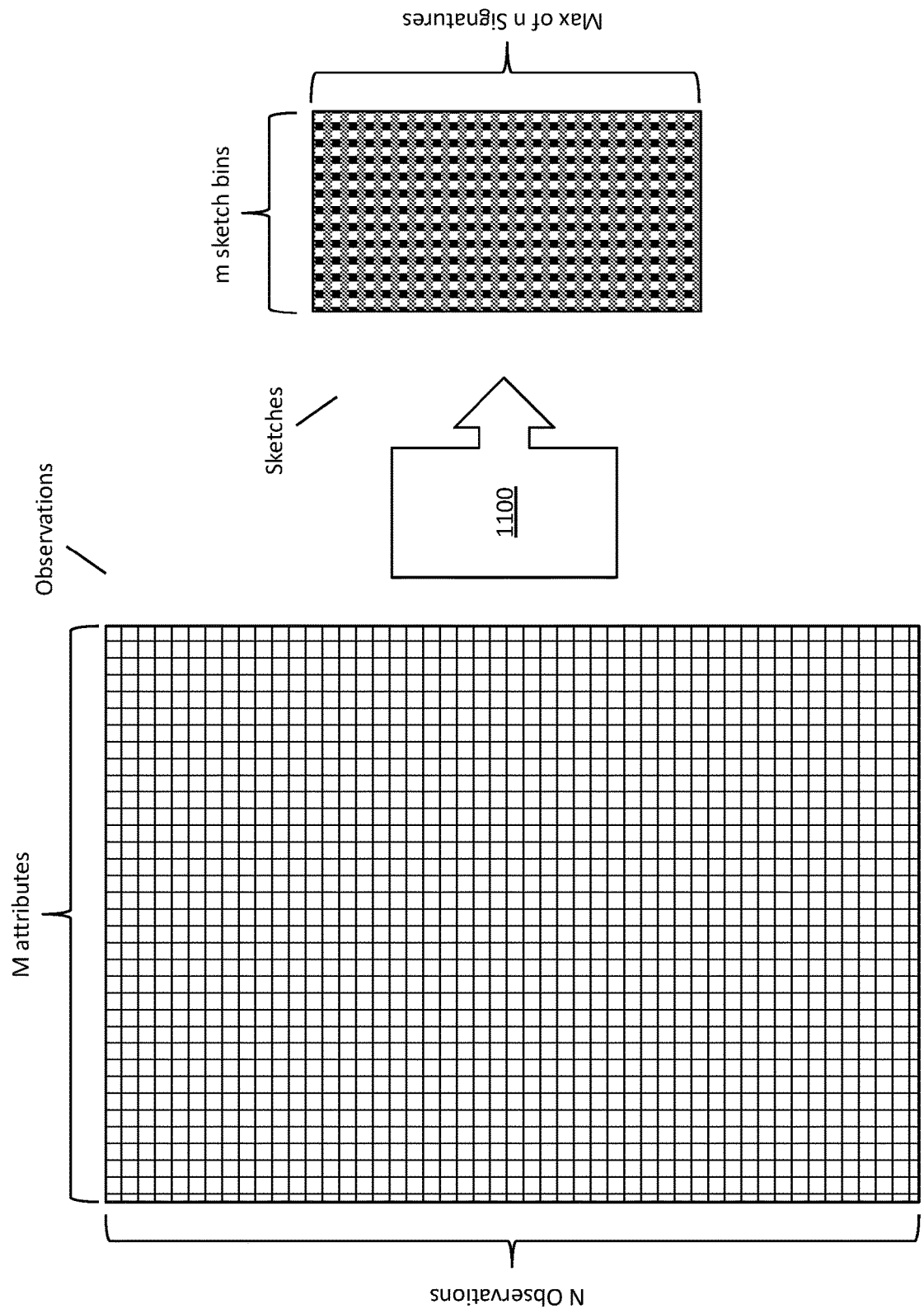
FIG. 13 is a diagram illustrating reduction of data size using categorical sketches according to certain embodiments.

Thus, as shown in FIG. 13, the data size of observations in a time period correspond to a number of N observations in the time period, and a number of M different attributes in the observations. The data size of the sketch bins for the time period corresponds to a number of m sketch bins and an average number of n signatures per sketch bin. The number N can be in the order of billions, and the number of M can be in the order of thousands, while the number of m is typically in the order of hundreds, and the number n is typically in the order of hundreds of thousands. Thus, the sketch generation process 1100 can be used to compress the data size used for forecasting by about $1/1,000,000$. Thus, the sketch generation process 1100 can be used to compress the data size used for forecasting by at least 10% in most cases, as cardinality is essentially derived from signatures, which, practically speaking, would manifest in only a few sketch bins. Additionally, the size of each signature has an upper bound and applying good quality hash functions can capture cardinality characteristics of a very large amount of data.

Figure 14:
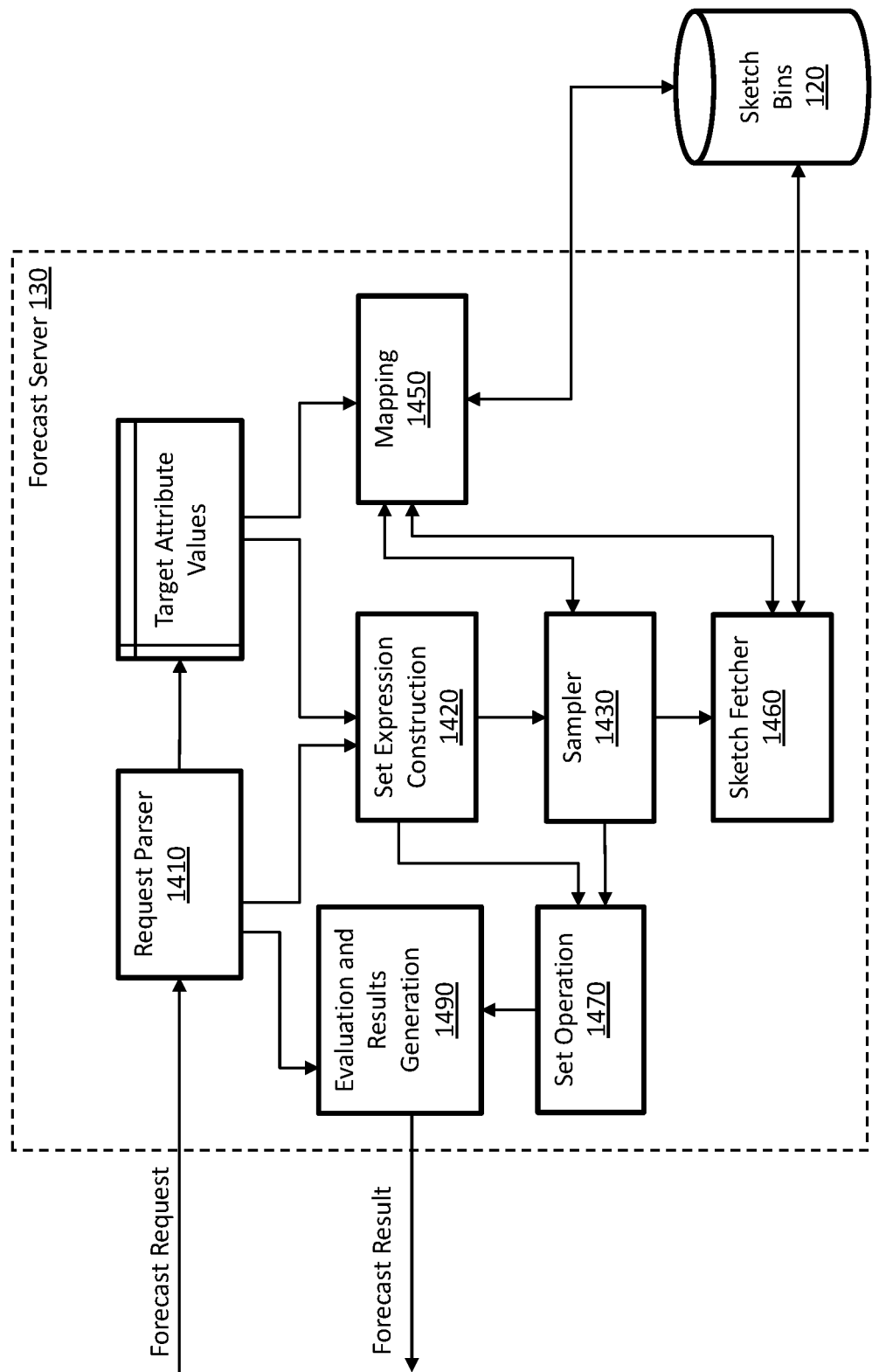
FIG. 14 is a diagrammatic representation of a forecast server according to certain embodiments.
Figure 15:
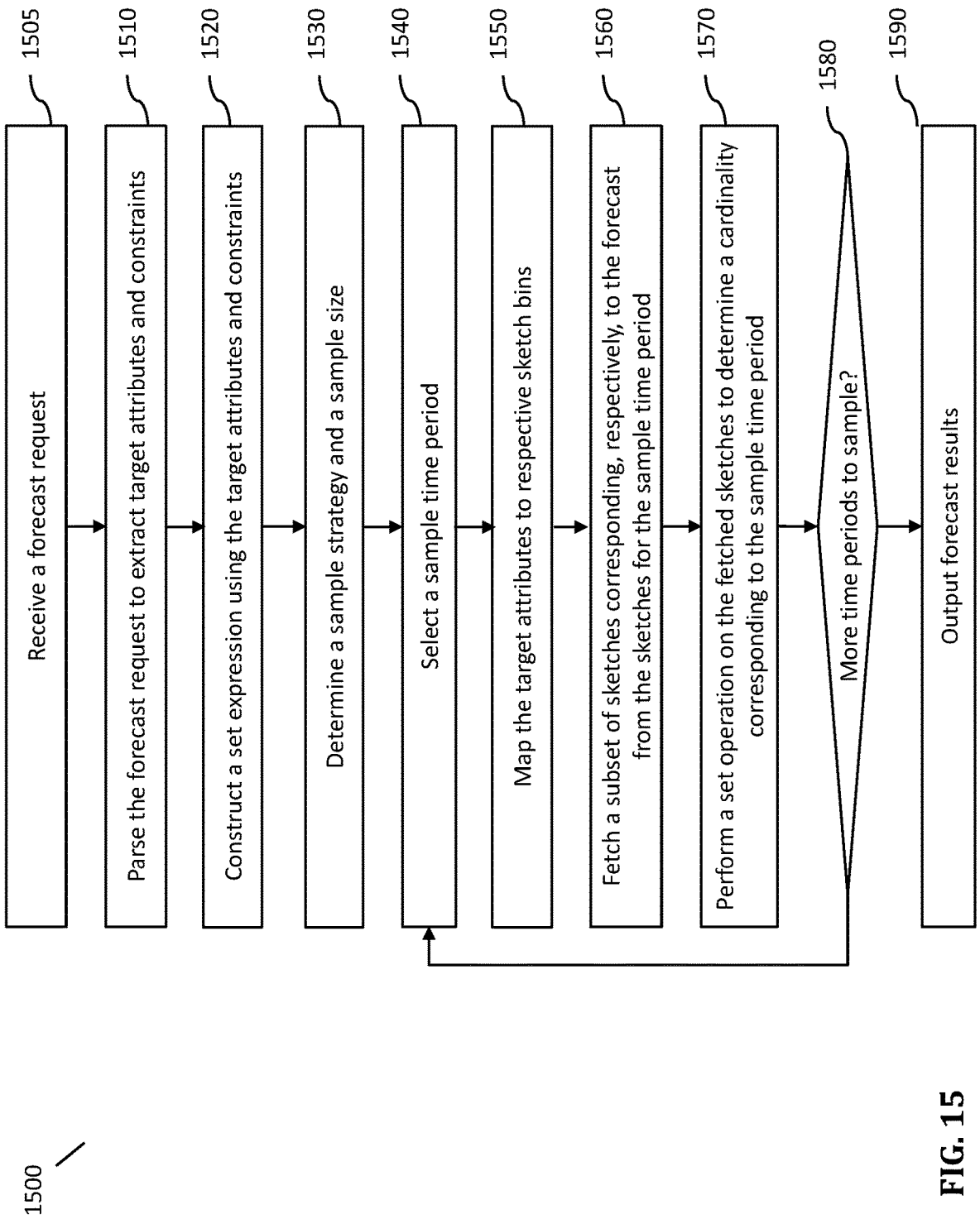
FIG. 15 is a flowchart illustrating a method of forecasting according to certain embodiments.

As shown in FIG. 14, according to certain embodiments, the forecast server 130 includes a request parser 1410, a set expression construction module 1420, a sampler 1430, a mapping module 1450, a sketch fetcher 1460, a set operation module 1470, and an evaluation and result generation module 1490. FIG. 15 illustrate a forecast process 1500 carried out by the forecast server 130 according to some embodiments. As shown in FIGS. 14 and 15, according to certain embodiments, the request parser 1410 is configured to receive (1505) a forecast request including forecast constraints, and to parse (1510) the forecast request to extract a set of targeted attributes from the forecast constraints. For example, the forecast request can include a JavaScript Object Notation (JSON) message, which can be parsed to extract a set of target attribute values and associated constraints, such as, for example:

{male, zip=94538, audience={30,25}}, meaning supply inventory having the attributes "gender/male" AND "zip code/94538" AND "audience/{30, 25}."

In some embodiments, the set expression construction module 1420 is configured to construct (1520) a set expression of the forecast constraints using the set of targeted attributes. In some embodiments, the set expression includes the set of targeted attributes and one or more logic operators (e.g., relational algebraic operators) interrelate the set of targeted attributes. For example, the set expression corresponding to the above example of forecast request can be:
|Result|=|male∩94538∩(audience=30 ∪audience=25)|.

In some embodiments, the sampler 1430 is configured to determine (1530) a sample strategy and a sample size. In some embodiments, a duration of the sample period is equal to a duration of each of the plurality of time periods. For example, assuming sampling without replacement is chosen with a sample size of 3, and setting the day when forecasting is performed as day 0, this means sketch bins made on any 3 random days before day 0 (e.g., day-7, day-20, day-1) can be used for forecasting. In practice, the sample size could be larger or smaller than 3. The sampler 1430 then proceeds to select (1540) a sample period (e.g., day-1).

In some embodiments, the mapping module is configured to map (1550) the target attributes to corresponding sketch bins for the sample period, including mapping the set of targeted attributes to sketches of observations in the sample period to identify a subset of sketches corresponding, respectively, to the set of targeted attributes. As an example, for the forecast request including the constraints:

{male, zip=94538, audience={30,25}}, the mapping module would identify the sketches stored in sketch bins corresponding to category/attribute values "gender/male," "zip code/94538," and "audience/{30, 25}. In some embodiments, the sketch fetcher 1460 is configured to fetch (1560) the sketches identified by the mapping module from the sketch database 120.

In some embodiments, the set operation module 1470 is configured to perform a set operation on the sketches fetched by the sketch fetching module 1460 using the set expression constructed by the set expression construction module 1420 to determine a cardinality (e.g., the number of unique observation signatures satisfying the set expression) corresponding to the sample period. The process 1500 then proceeds to determine (1580) whether there are additional sample period(s), and reiterate steps 1540 through 1570 for each of the additional sample period(s).

In some embodiments, the result generation module (1490) is configured to generate a forecast result based on one or more cardinalities corresponding to one or more sample periods and output (1590) the forecast result. For example, the forecast result can be in the form of a range represented by an overall minimum and maximum cardinalities. Practical variations could be applied to do range constriction based on outlier analysis or trimmed means for a more robust forecast interval.

As another example, for a forecast request including:
{Request Body={creative='image', banner_size='320× 50', zip={94538,94536,94539}, beh_audience={'genx', 'millennials'}},
meaning supply inventory having the attributes: creative='image', banner_size='320×50', zip={94538, 94536,94539}, beh_audience={'genx', 'millennials'}, the following set expression can be constructed:
creative=image∩banner_size='320=50' ∩{94538∪94536∪94539} ∩(beh_audience='genx' ∪beh_audience='millennials')
where each of the attributes: creative=image, banner_size='320×50', zip×94538, zip=94536, zip=94539, beh_audience='genx', beh_audience='millennials, corresponds to a respective sketch bin.

Assuming, for example, a sample size of 5, and day 0 is the day of forecast, the following 5 historical days can be randomly picked for forecasting: day_list=[d-5, d-1, d-7, d-10, d-15]. In practice, the sample size could be larger or smaller than 5. Subsequently, for each day in the day_list, the sketch bins identified above in the set expression and made for that day are fetched, and cardinality for the day can be determined as follows:

|Result|$_{d-5}$=|creative=image∩banner_size='320×50' ∩{94538∪94536∪94539}∪(beh_audience='genx' ∪beh_audience='millennials')|=132, 466

|Result|$_{d-1}$=|creative=image ∩banner_size='320× 50'∩{94538∪94536∪94539}∩(beh_audience='genx' ∪beh_audience='millennials')|=102, 401

|Result|$_{d-7}$=|creative=image ∩banner_size='320× 50'∩{94538∪94536∪94539}∩(beh_audience='genx' ∪beh_audience='millennials')|=99, 121

|Result|$_{d-10}$=|creative=image∩banner_size='320× 50'∩{94538∪94536 ∪94539}∩(beh_audience='genx' ∪beh_audience='millennials')|=10, 998

|Result|$_{d-15}$=|creative×image∩banner_size='320× 50'∩{94538∪94536∪94539}∩(beh_audience='genx' ∪beh_audience='millennials')|=120, 998

Afterwards, range merge or range constriction from the above results can be performed to obtain final result. Practical variations could be applied when performing range constriction based on 'outlier analysis' or 'trimmed means' for a more robust forecast range. For this example, minimum and maximum of the above results can be taken and output that as a forecast range (or forecast interval), e.g., Final_Forecast_Interval$_{min\_max}$={99121, 132466} or

Final_Forecast_Interval$_{outlier\_analysis}$={99121, 132466} when the outlier is simply dropped; or

Final_Forecast_Interval$_{trimmed\_means}$={(99121+102401)/2, (102401+120998)/2}={100761, 111699}.

Such outlier analysis and trimmed means is to produce a robust forecast (e.g., a forecast that does not jump around a lot and is fairly stable). Variations of the outlier analysis and trimmed means demonstrated above can also be used to achieve the same purpose.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

We claim:

1. A forecast system, comprising:
   one or more processors having access to big data of observations, each observation including a combination of attributes and a time stamp; and
   non-transitory computer readable medium storing therein program logic executable by the one or more processors, wherein the one or more processors when executing the program logic are configured to:
   for each respective observation of a first plurality of observations, parse the respective observation to determine respective attributes in the respective observation and apply one or more functions to the respective observation one or more times to obtain a respective signature of the respective observation;
   for each respective time period of a plurality of time periods, transform a second plurality of observations having time stamps in the respective time period into a respective plurality of sketches of observations in the respective time period, whereby each particular sketch in the respective plurality of sketches is associated with a particular attribute value of a plurality of categorical attribute values and includes signatures of at least some observations among the second plurality of observations, each of the at least some observations having at least one attribute that corresponds to the particular attribute value;
   receive a forecast request including forecast constraints, and sparse the forecast request to extract a set of targeted attributes from the forecast constraints;
   construct a set expression of the forecast constraints using the set of targeted attributes;
   select one or more sample periods from the plurality of time periods and, for each sample period of the one or more selected sample periods:
      map the set of targeted attributes to sketches of observations in the sample period to identify a set of sketches corresponding, respectively, to the set of targeted attributes; and
      perform a set operation on the set of sketches using the set expression to determine a cardinality corresponding to the sample period; and
   generate a forecast result based on one or more cardinalities corresponding to the one or more sample periods.

2. The system of claim 1, wherein the one or more processors executing the program logic are configured to transform the second plurality of observations having time stamps in the respective time period into the respective plurality of sketches of observations in the respective time period by:
   allocating a plurality of sketch bins corresponding, respectively, to the plurality of categorical attribute values, whereby respective ones of the plurality of sketch bins are associated with respective ones of the plurality of categorical attribute values; and
   populating the plurality of sketch bins for the respective time period with signatures of observations in the respective time period, such that each populated sketch bin of the plurality of sketch bins is populated with one or more signatures of one or more observations, each of the one or more observations having an attribute that corresponds to the categorical attribute value associated with the populated sketch bin.

3. The system of claim 2, wherein the plurality of categorical attribute values is associated with a plurality of categories of attributes, each category having one or more categorical attributes, and each categorical attribute having one or more categorical attribute values.

4. The system of claim 1, wherein the one or more processors executing the program logic are configured to apply a hash function to an observation ID of the respective observation multiple times to generate multiple hashed values of an observation ID as the respective signature.

5. The system of claim 1, wherein each of the plurality of time periods has a duration equal to that of one day.

6. The system of claim 1, wherein a duration of the sample period is equal to a duration of each of the plurality of time periods.

7. The system of claim 1, wherein the second plurality of observations includes at least one million observations.

8. The system of claim 7, wherein each of the at least one million observations include at least 100 attributes.

9. The system of claim 1, wherein the set expression includes the set of targeted attributes and one or more relational algebraic operators interrelate the set of targeted attributes.

10. A method of forecasting, comprising:
at one or more computer systems having access to big data of observations, each observation including a combination of attributes and a time stamp:
for each respective observation of a first plurality of observations, parsing the respective observation to determine respective attributes in the respective observations and applying one or more functions to the respective observation one or more times to obtain a respective signature of the respective observation;
for each respective time period of a plurality of time periods, transforming a second plurality of observations having time stamps in the respective time period into a respective plurality of sketches of observations in the respective time period, whereby each particular sketch in the respective plurality of sketches is associated with a particular attribute value of a plurality of categorical attribute values and includes signatures of at least some observations among the second plurality of observations, each of the at least some observations having at least one attribute that corresponds to the particular attribute value;
receiving a forecast request, the forecast request including forecast constraints;
extracting a set of targeted attributes from the forecast constraints;
construct a set expression of the forecast constraints using the set of targeted attributes;
select one or more sample periods from the plurality of time periods;
for each sample period of the one or more selected sample periods:
mapping the set of targeted attributes to sketches of observations in the sample period to identify a set of sketches corresponding, respectively, to the set of targeted attributes; and
performing a set operation on the set of sketches using the set expression to determine a cardinality corresponding to the sample period; and
generating a forecast result based on one or more cardinalities corresponding to the one or more sample periods.

11. The method of claim 10, wherein transforming the second plurality of observations having time stamps in the respective time period into the respective plurality of sketches of observations in the respective time period includes:
for each of the plurality of time periods, allocating a plurality of sketch bins corresponding, respectively, to the plurality of categorical attribute values, whereby respective ones of the plurality of sketch bins are associated with respective ones of the plurality of categorical attribute values; and
populating the plurality of sketch bins for the respective time period with signatures of observations in the respective time period, such that each populated sketch bin of the plurality of sketch bins is populated with one or more signatures of one or more observations, each of the one or more observations having an attribute that corresponds to the categorical attribute value associated with the populated sketch bin.

12. The method of claim 11, wherein the plurality of categorical attribute values is associated with a plurality of categories of attributes, each category having one or more categorical attributes, and each categorical attribute having one or more categorical attribute values.

13. The method of claim 10, wherein applying one or more hash function to the respective observation comprises applying a hash function to an observation ID of the respective observation multiple times to generate multiple hashed values as the respective signature.

14. The method of claim 10, wherein each of the plurality of time periods has a duration equal to that of one day.

15. The method of claim 10, wherein a duration of the sample period is equal to a duration of each of the plurality of time periods.

16. The method of claim 10, wherein the second plurality of observations includes at least one million observations.

17. The method of claim 16, wherein each of the at least one million observations include at least 100 attributes.

18. The method of claim 10, wherein the set expression includes the set of targeted attributes and one or more relational algebraic operators interrelate the set of targeted attributes.

* * * * *